US007114916B2

(12) United States Patent
Dube et al.

(10) Patent No.: US 7,114,916 B2
(45) Date of Patent: Oct. 3, 2006

(54) TAILORED TURBULATION FOR TURBINE BLADES

(75) Inventors: Bryan P. Dube, Columbia, CT (US); William Abdel-Messeh, Middletown, CT (US); Daniel Herrera, East Hartford, CT (US); Richard Page, Guilford, CT (US)

(73) Assignee: United Technologies Corporation, Hartford, CT (US)

( * ) Notice: Subject to any disclaimer, the term of this patent is extended or adjusted under 35 U.S.C. 154(b) by 56 days.

(21) Appl. No.: 10/774,822

(22) Filed: Feb. 9, 2004

(65) Prior Publication Data

US 2005/0175452 A1 Aug. 11, 2005

(51) Int. Cl.
*F03D 11/00* (2006.01)

(52) U.S. Cl. ........................ 415/115; 416/95; 416/96 R

(58) Field of Classification Search ................ 415/115, 415/116; 416/95, 96 R, 97 R, 96 A, 97
See application file for complete search history.

(56) References Cited

U.S. PATENT DOCUMENTS

| | | | | |
|---|---|---|---|---|
| 5,232,343 | A * | 8/1993 | Butts | 416/97 R |
| 5,413,463 | A | 5/1995 | Chiu et al. | |
| 5,924,843 | A * | 7/1999 | Staub et al. | 415/115 |
| 6,416,283 | B1 * | 7/2002 | Johnson et al. | 416/97 R |
| 6,672,836 | B1 * | 1/2004 | Merry | 416/97 R |

* cited by examiner

*Primary Examiner*—Edward K. Look
*Assistant Examiner*—Dwayne J White
(74) *Attorney, Agent, or Firm*—Bachman & LaPointe

(57) ABSTRACT

A turbine blade having improved cooling characteristics is provided. The turbine blade has an airfoil portion having a span, and at least one cooling passageway in the airfoil portion extending from a root portion of the airfoil portion to a tip portion of the airfoil portion. A plurality of turbulation promotion devices are placed in the at least one cooling passageway. The turbulation promotion devices have a P/e ratio which varies along the span of the airfoil portion, where P is the pitch between adjacent turbulation promotion devices and e is the height of the turbulation promotion devices.

22 Claims, 3 Drawing Sheets

TAILORED TURBULATION FOR TURBINE BLADES

BACKGROUND OF THE INVENTION (a) Field of the Invention

The present invention relates to gas turbine engines in general and in particular to turbine blades or buckets having cooling passages with a plurality of turbulators tailored for heat load.

(b) Prior Art

It is customary in turbine engines to provide internal cooling passages in turbine blades or buckets. It has also been recognized that the various stages of turbine rotors within the engines require more or less cooling, depending upon the specific location of the stage in the turbine. First stage turbine buckets usually require the highest degree of cooling because those turbine blades, located after the first vane, are the blades exposed immediately to the hot gases of combustion flowing from the combustors. It is also known that the temperature profile across each turbine blade peaks along an intermediate portion of the blade and that the temperatures adjacent the root and tip portions of the blades are somewhat lower than the temperatures along the intermediate portion.

In some cases, a plurality of cooling passages are provided within the turbine blades extending from the blade root portion to the tip portion. Cooling air from one of the stages of the compressor is conventionally supplied to these passages to cool the blades. Turbulence promoters or turbulators have been employed throughout the entire length of these passages to enhance the heat transfer of the cooling air through the passages. Thermal energy conducts from the external pressure and suction surfaces of turbine blades to the inner zones, and heat is extracted by internal cooling. Heat transfer performance in a ribbed channel primarily depends on the channel diameter, the rib configuration, and the flow Reynolds number. There have been many fundamental studies to understand the heat transfer enhancement phenomena by the flow separation caused by the ribs. In the flow past surface-mounted ribs, a boundary layer separates upstream and downstream of the ribs. These flow separations reattach the boundary layer to the heat transfer surface, thus increasing the heat transfer coefficient. The separated boundary layer enhances turbulent mixing, and therefore the heat from the near-surface fluid can more effectively get dissipated to the main flow, thus increasing the heat transfer coefficient.

The turbulence promoters used in these passageways take many forms. For example, they may be chevrons attached to side walls of the passageway, which chevrons are at an angle to the flow of cooling air through the passageway.

U.S. Pat. No. 5,413,463 to Chiu et al. illustrates turbulated cooling passages in a gas turbine bucket where turbulence promoters are provided at preferential areas along the length of the airfoil from the root to the tip portions, depending upon the local cooling requirements along the blade. The turbulence promoters are preferentially located in the intermediate region of the turbine blade, while the passages through the root and tip portions of the blade remain essentially smoothbore.

Despite the existence of these turbine blades having turbulated cooling passageways, there remains a need for blades which have improved cooling.

SUMMARY OF THE INVENTION

Accordingly, it is an object of the present invention to provide a turbine engine component having one or more cooling passageways with turbulation tailored for heat load.

The foregoing object is attained by the turbine blade of the present invention.

In accordance with the present invention, a turbine engine component having improved cooling characteristics is provided. The turbine engine component has an airfoil portion having a span, and at least one cooling passageway in the airfoil portion extending from a root portion of the airfoil portion to a tip portion of the airfoil portion. A plurality of turbulation promotion devices are placed in the at least one cooling passageway. The turbulation promotion devices have a P/e ratio which varies along the span of the airfoil portion, where P is the pitch between adjacent turbulation promotion devices and e is the height of the turbulation promotion devices.

Other details of the tailored turbulation for turbine blades of the present invention, as well as other objects and advantages attendant thereto, are set forth in the following detailed description and the accompanying drawings wherein like reference numerals depict like elements.

DETAILED DESCRIPTION OF THE PREFERRED EMBODIMENT(S)

Figure 1:
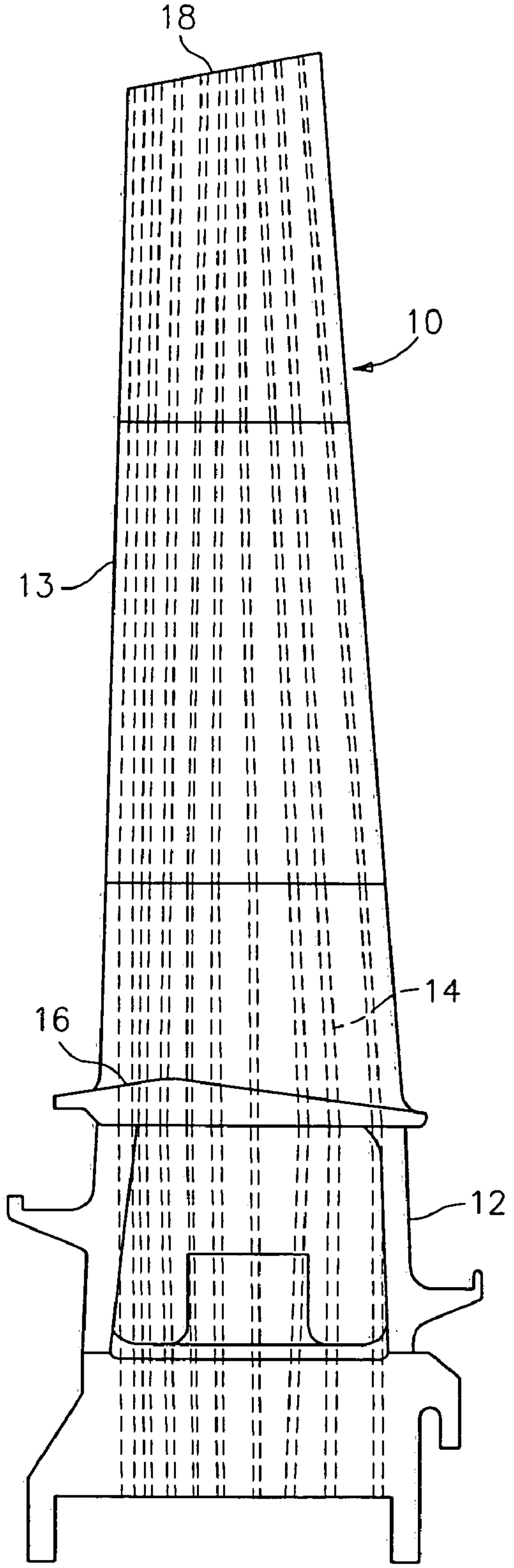
FIG. 1 illustrates a turbine blade used in a gas turbine engine having a plurality of internal cooling passageways.

Referring now to FIG. 1, there is illustrated a gas turbine blade 10 mounted on a pedestal 12 and having an airfoil portion 13 in which a plurality of internal cooling passages 14 extends. The cooling passages 14 extend through the blade over its entire length, including from a root portion 16 to a tip portion 18. The cooling passages 14 exit at the tip of the blade. The cooling passages 14 conduct cooling fluid, e.g. air, from inlets in communication with a source of the cooling fluid, such as compressor extraction air, throughout their entire length for purposes of cooling the material, e.g. metal, of the blade 10.

Figure 2:
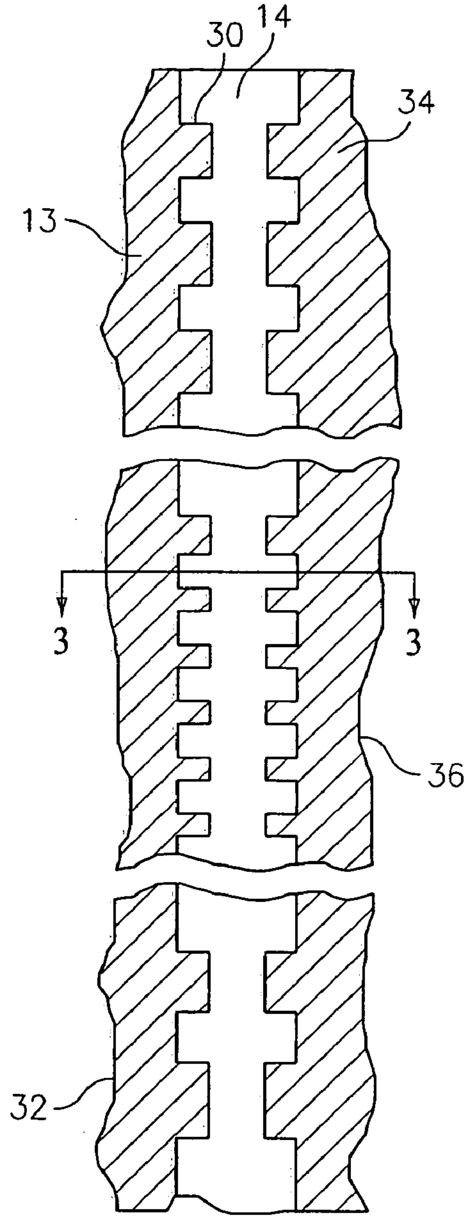
FIG. 2 is a sectional view of a cooling passageway in accordance with the present invention.
Figure 3:
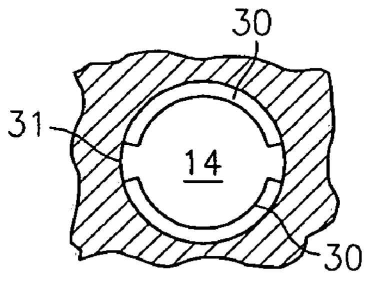
FIG. 3 is a cross sectional view taken along lines 3—3 in FIG. 2.
Figure 4:
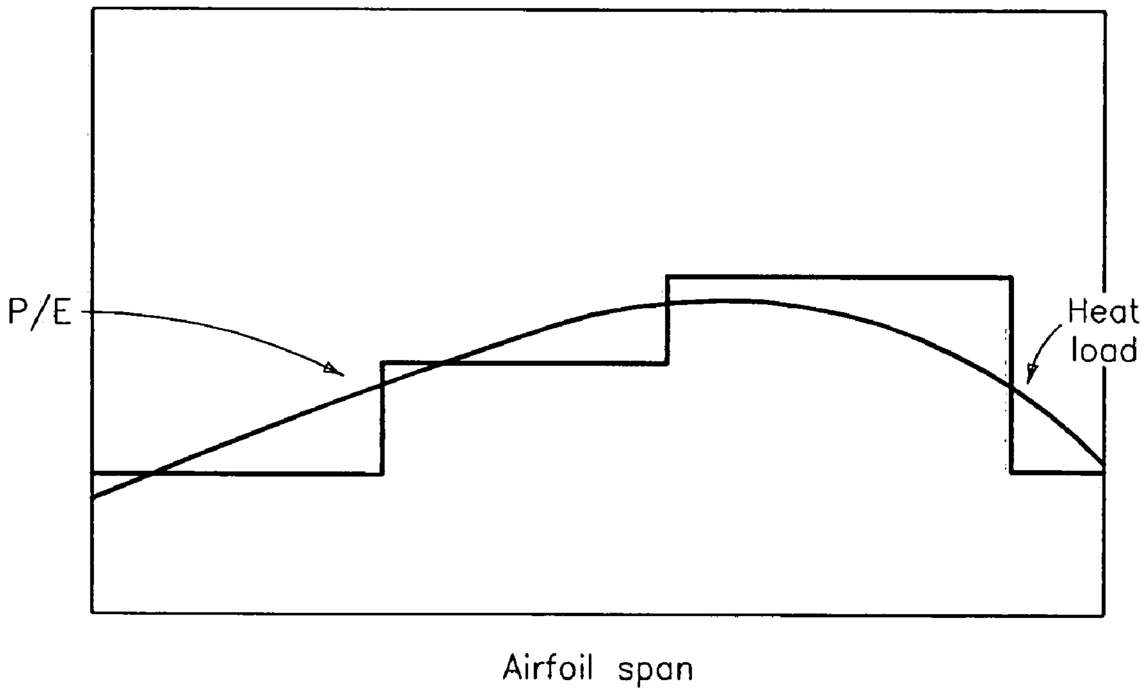
FIG. 4 is a graph illustrating a cooling passageway having tailored turbulation in accordance with the present invention.

In accordance with the present invention, as shown in FIGS. 2 and 3, each of the cooling passages 14 has a plurality of turbulators 30, preferably in the form of pairs of trip strips which extend about the walls 31 of the cooling passages 14. More turbulators 30, having a lower P/e ratio, are used in areas, such as a mid-span region, that have more predicted heat load in them. The number of turbulators 30 are decreased when higher heat transfer requirements are not needed, thus yielding a higher P/e ratio in those areas. This may be done in accordance with the present invention, as shown in FIG. 4, by varying the ratio of the pitch (P) to the height (e) of the strips as heat load changes along the span of the airfoil 13. Thus, as stated above, lower P/e ratios will be used in high heat load areas, mainly the mid-span of the airfoil 13, and higher P/e ratios will be used in areas that do not require as much heat load protection, such as inlet and outlet sections of the cooling passage.

As shown in FIG. 2, the cooling passage 14 has an inlet region 32 where the turbulators 30 may have a decreased height (e) and/or an increased pitch (P) (i.e. the distance between the mid-width points of adjacent trip strips or turbulators). The cooling passageway 14 has an outlet region 34 where the turbulators 30 again may have a decreased height (e) and/or an increased pitch (P). Still further, the cooling passage 14 has a mid-span region 36 where the turbulators 30 may have an increased height and/or a decreased pitch. While the cooling passage 14 has been shown as having one mid-span region, it could have more than one mid-span region with each mid-span region having different P/e ratios.

The turbine blade 10 of the present invention may be formed from any suitable metal known in the art such as a nickel based superalloy and may be cast using any suitable technique known in the art. The cooling passageways 14 and the turbulators 30 may be formed using any suitable technique known in the art such as STEM drilling or EDM milling. In a typical turbine blade, there are a plurality of cooling passages 14 along the chord of the airfoil 13.

Figure 5:
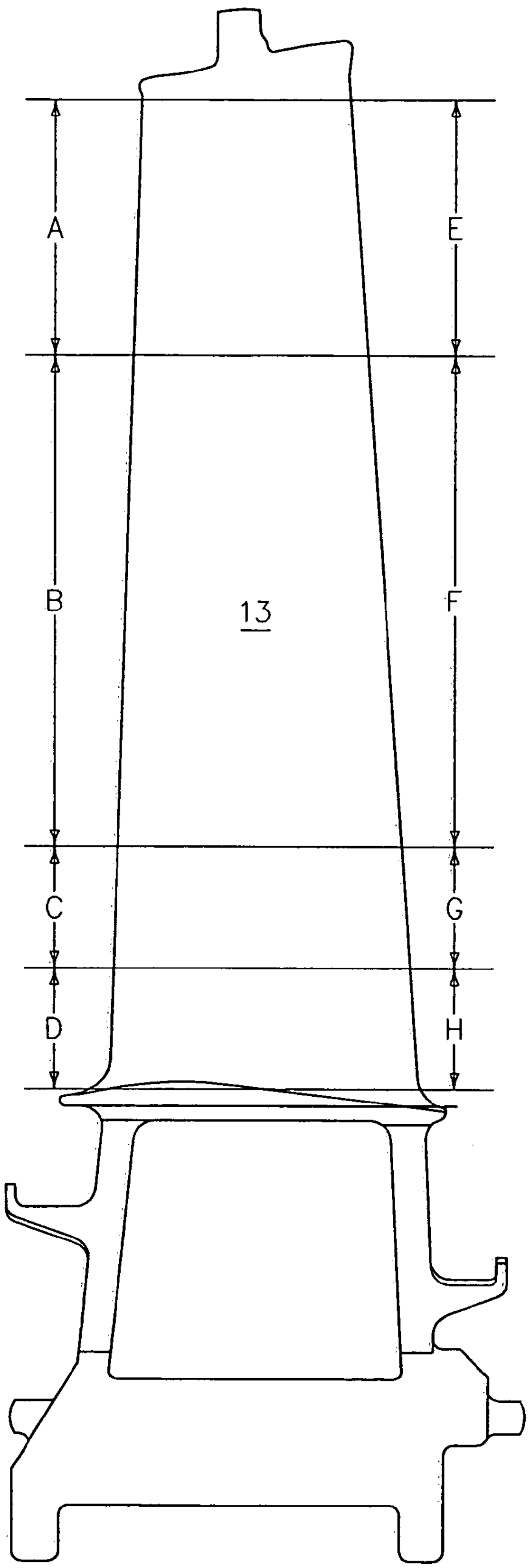
FIG. 5 illustrates a turbine blade having a plurality of zones having different pitch/height ratios in accordance with the present invention.

FIG. 5 illustrates a turbine blade 10 in accordance with the present invention which has eight zones designated A–H. Depending on the location of a particular passageway, the pitch P of the turbulators 30 in zones A, E, C and G may vary from 0.050 inches to 0.500 inches, preferably from 0.180 inches to 0.290 inches, and the height e of the turbulators 30 may vary from 0.004 inches to 0.050 inches, preferably from 0.008 inches to 0.010 inches. In zones B and F, the pitch may vary from 0.050 to 0.500 inches, preferably from 0.110 inches to 0.180 inches, and the height of the turbulators may be from 0.004 inches to 0.050 inches, preferably from 0.008 inches to 0.010 inches. In zones D and H, the pitch may vary from 0.050 to 0.500 inches, preferably from 0.360 inches to 0.362 inches, and the height may vary from 0.004 inches to 0.050 inches, preferably from 0.008 inches to 0.010 inches.

In each of the zones A–H, the P/e ratio may be in the range of from 5 to 30. Further, the ratio of the height (e) to the diameter (D) in each of the zones may be in the range of from 0.05 to 0.30.

While the pitch in a particular zone for a particular cooling passage 14 in the blade 10 may vary from cooling passage to cooling passage, it is possible to design a blade so that the pitch in a particular zone is constant for each cooling passage.

While the turbulators 30 have been shown as being aligned, the turbulators 30 may be staggered if desired.

Further, while the turbulators 30 have been shown as having surfaces normal to the flow F through the cooling passage, the turbulators 30 could have surfaces which are at an angle with respect to the flow F, such as surfaces at an angle in the range of from 30 to 70 degrees with respect to the flow F.

As can be seen from the foregoing discussion, the present invention presents a turbine blade which better addresses the cooling needs of the turbine blade. This accomplished by varying the density of the turbulators along the span of the airfoil portion of the turbine blade.

While the cooling scheme of the present invention has been described in the context of a turbine blade, it should be recognized that the same cooling scheme could be employed in any turbine engine component having cooling passages in which the heat load varies along the length of the cooling passage.

It is apparent that there has been provided in accordance with the present invention a tailored turbulation for turbine blades which fully satisfies the objects, means, and advantages set forth hereinbefore. While the present invention has been described in the context of specific embodiments thereof, other alternatives, modifications, and variations will become apparent to those skilled in the art having read the foregoing detailed description. Accordingly, it is intended to embrace those alternatives, modifications, and variations as fall within the broad scope of the appended claims.

What is claimed is:

1. A turbine engine component comprising:

an airfoil portion having a span;

at least one cooling passageway in said airfoil portion extending from a root portion of said airfoil portion to a tip portion of said airfoil portion; and a plurality of turbulation promotion devices in said at least one cooling passageway, said turbulation promotion devices comprising a plurality of spaced apart pairs of arcuately shaped trip strips, said turbulation promotion devices having a P/e which varies along the span of said airfoil portion, where P is the pitch between adjacent ones of said turbulation promotion devices and e is the height of each said turbulation promotion device, wherein the P/e ratio of said turbulation promotion devices is lower in a midspan region of said at least one cooling passageway than in an end region of said at least one cooling passageway and wherein said P/e ratio is in the range of from 5 to 30 in said midspan region.

2. A turbine engine component according to claim 1, wherein said P/e ratio is lower in a midspan region of said at least one cooling passageway and is higher in non-midspan regions of said at least one cooling passageway.

3. A turbine engine component according to claim 1, wherein said pitch in a region near said root portion varies from 0.350 to 0.362 inches.

4. A turbine engine component according to claim 1, wherein said pitch in a mid-span region varies from 0.110 to 0.180 inches.

5. A turbine engine component according to claim 1, wherein said pitch in region near said tip portion varies from 0.180 inches to 0.290 inches.

6. A turbine engine component according to claim 1, wherein said height varies from 0.008 inches to 0.010 inches.

7. A turbine engine component according to claim 1, wherein said turbine blade has a plurality of cooling passageways, each said cooling passageway having a plurality of turbulation promotion devices, and said turbulation promotion devices in each of said cooling passageways having a P/e ratio which varies along the span of the airfoil portion.

8. A turbine engine component according to claim 1, wherein said component comprises a turbine blade.

9. A turbine engine component according to claim 1, wherein said turbulator promotion devices have a surface at an angle with respect to a flow of cooling fluid through a respective one of said cooling passageways.

10. A turbine engine component according to claim 9, wherein said angle is in the range of from 30 to 70 degrees with respect to the flow.

11. A turbine engine component comprising:

an airfoil portion having a span;

at least one cooling passageway in said airfoil portion extending from a root portion of said airfoil portion to a tip portion of said airfoil portion;

a plurality of turbulation promotion devices in said at least one cooling passageway, said turbulation promotion devices comprising a plurality of spaced apart pairs of arcuately shaped trip strips, said turbulation promotion devices having a P/e which varies along the span of said airfoil portion, where P is the pitch between adjacent ones of said turbulation promotion devices and e is the height of each said turbulation promotion device;

wherein the P/e ratio of said turbulation promotion devices is lower in a midspan region of said at least one cooling passageway than in an end region of said at least one cooling passageway, and wherein said P/e ratio is in the range of from 5 to 30 in said end region.

12. A turbine engine component comprising:

an airfoil portion having a span;

at least one cooling passageway in said airfoil portion extending from a root portion of said airfoil portion to a tip portion of said airfoil portion;

a plurality of turbulation promotion devices in said at least one cooling passageway, said turbulation promotion devices comprising a plurality of spaced apart pairs of arcuately shaped trip strips, said turbulation promotion devices having a P/e which varies along the span of said airfoil portion, where P is the pitch between adjacent ones of said turbulation promotion devices and e is the height of each said turbulation promotion device; and wherein said pitch in a region near said root portion varies from 0.050 to 0.500 inches.

13. A turbine engine component comprising:

an airfoil portion having a span;

at least one cooling passageway in said airfoil portion extending from a root portion of said airfoil portion to a tip portion of said airfoil portion;

a plurality of turbulation promotion devices in said at least one cooling passageway, said turbulation promotion devices comprising a plurality of spaced apart pairs of arcuately shaped trip strips, said turbulation promotion devices having a P/e which varies along the span of said airfoil portion, where P is the pitch between adjacent ones of said turbulation promotion devices and e is the height of each said turbulation promotion device; and wherein said pitch in a mid-span region varies from 0.050 inches to 0.500 inches.

14. A turbine engine component comprising:

an airfoil portion having a span;

at least one cooling passageway in said airfoil portion extending from a root portion of said airfoil portion to a tip portion of said airfoil portion;

a plurality of turbulation promotion devices in said at least one cooling passageway, said turbulation promotion devices comprising a plurality of spaced apart pairs of arcuately shaped trip strips, said turbulation promotion devices having a P/e which varies along the span of said airfoil portion, where P is the pitch between adjacent ones of said turbulation promotion devices and e is the height of each said turbulation promotion device; and wherein said pitch in a region near said tip portion varies from 0.050 inches to 0.500 inches.

15. A turbine engine component comprising:

an airfoil portion having a span;

at least one cooling passageway in said airfoil portion extending from a root portion of said airfoil portion to a tip portion of said airfoil portion;

a plurality of turbulation promotion devices in said at least one cooling passageway, said turbulation promotion devices comprising a plurality of spaced apart pairs of arcuately shaped trip strips, said turbulation promotion devices having a P/e which varies along the span of said airfoil portion, where P is the pitch between adjacent ones of said turbulation promotion devices and e is the height of each said turbulation promotion device; and wherein said height varies from 0.004 inches to 0.050 inches.

16. A turbine engine component comprising:

an airfoil portion having a span;

at least one cooling passageway in said airfoil portion extending from a root portion of said airfoil portion to a tip portion of said airfoil portion;

a plurality of turbulation promotion devices in said at least one cooling passageway, said turbulation promotion devices comprising a plurality of spaced apart pairs of arcuately shaped trip strips, said turbulation promotion devices having a P/e which varies along the span of said airfoil portion, where P is the pitch between adjacent ones of said turbulation promotion devices and e is the height of each said turbulation promotion device; and wherein said at least one cooling passageway has a diameter D and the ratio of e/D is in the range of 0.05 to 0.30.

17. A method for manufacturing a turbine engine component comprising:

forming a component having an airfoil portion with a root portion, a tip portion and a span;

fabricating at least one cooling passage in said component having a plurality of turbulation promotion devices having a P/e ratio which varies along the span of said component, where P is the pitch between adjacent ones of said turbulation promotion devices and e is the height of a respective turbulation promotion device;

said fabricating step further comprising providing a first region of each said cooling passage adjacent said root portion of said airfoil portion with turbulation promotion devices having a first P/e ration and providing a mid span region of each said cooling passage with turbulation promotion devices having a second P/e ratio which is lower than said first P/e ratio; and said fabricating step further comprising providing a third region of each said cooling passage adjacent said tip portion of said airfoil portion with turbulation promotion devices having a third P/e ratio which is greater than said second P/e ratio.

18. A method according to claim 17, wherein said fabricating step further comprises providing said third P/e ratio so that it is greater than said first P/e ratio.

19. A method according to claim 17, wherein said turbine component forming step comprises forming a turbine blade.

20. A method according to claim 17, wherein said turbine component forming step comprises forming said turbine engine component by a casting technique.

21. A turbine engine component comprising:

an airfoil portion having a span;

at least one cooling passageway in said airfoil portion extending from a root portion of said airfoil portion to a tip portion of said airfoil portion; and a plurality of turbulation promotion devices in said at least one cooling passageway, said turbulation promotion devices having a P/e which varies along the span of said airfoil portion, where P is the pitch between adjacent turbulation promotion devices and e is the height of each said turbulation promotion device;

each said cooling passageway having a first region adjacent said root portion of said airfoil portion with a plurality of said turbulation promotion devices having a first P/e, a mid span region having a plurality of said turbulation providing devices having a second P/e ratio which is lower than said first P/e, and a third region adjacent said tip portion of said airfoil portion with a plurality of said turbulation promotion devices having a third P/e ratio which is greater than said second P/e ratio.

22. A turbine engine component according to claim 21, wherein said third P/e ratio is greater than said first P/e ratio.

* * * * *

UNITED STATES PATENT AND TRADEMARK OFFICE

CERTIFICATE OF CORRECTION

PATENT NO. : 7,114,916 B2
APPLICATION NO. : 10/774822
DATED : October 3, 2006
INVENTOR(S) : Bryan P. Dube et al.

It is certified that error appears in the above-identified patent and that said Letters Patent is hereby corrected as shown below:

In column 6, claim 17, line 46, “ration” should read --ratio--.

Signed and Sealed this

Twenty-seventh Day of November, 2007

JON W. DUDAS

*Director of the United States Patent and Trademark Office*